UNITED STATES PATENT OFFICE.

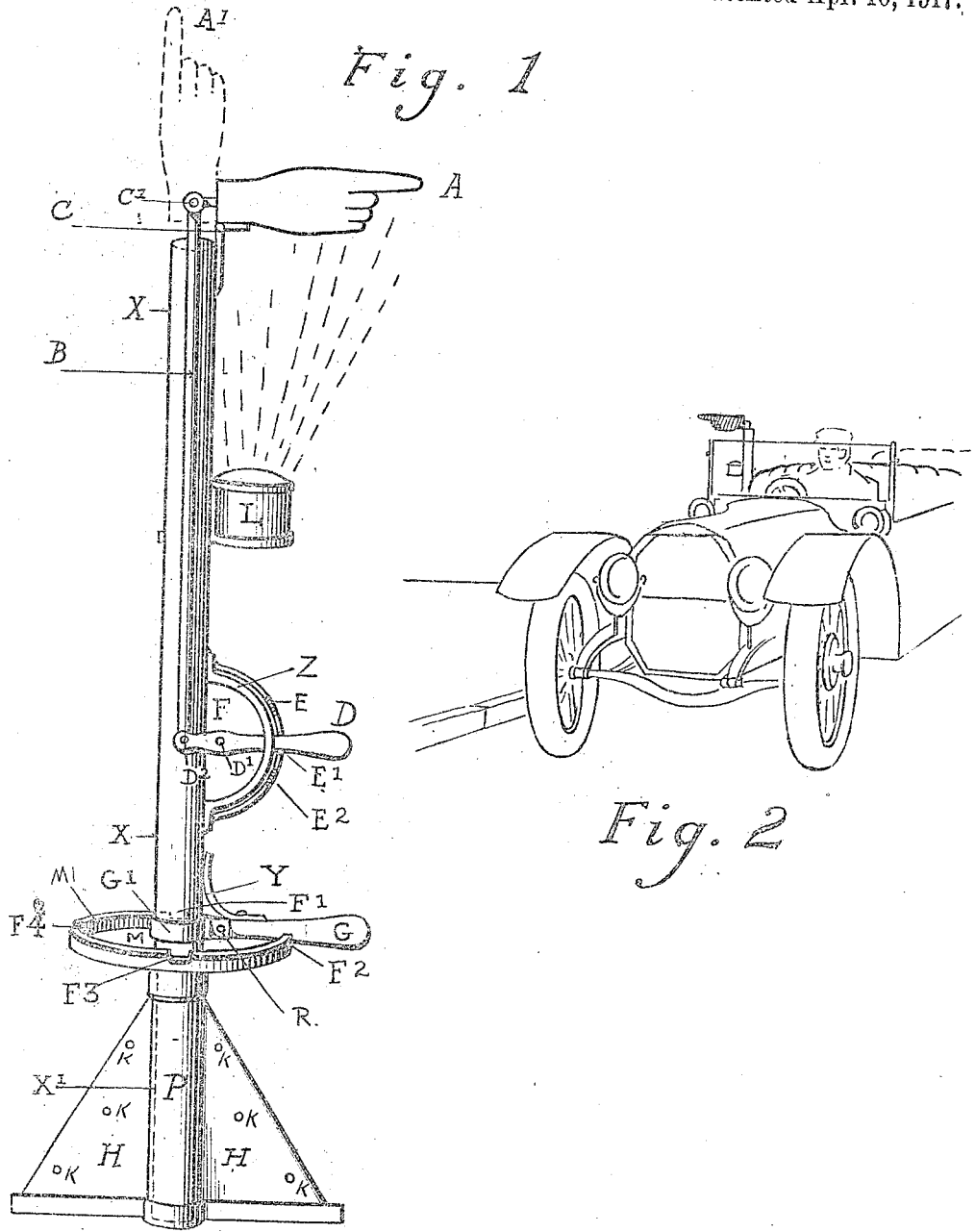

JOHN L. M. KELLY, OF TRENTON, NEW JERSEY.

AUTOMOBILE AND VEHICLE SIGNALING DEVICE.

1,222,301.       Specification of Letters Patent.        Patented Apr. 10, 1917.

Application filed September 17, 1913. Serial No. 790,282.

*To all whom it may concern:*

Be it known that I, JOHN L. M. KELLY, a citizen of the United States, residing at Trenton, in the county of Mercer and State of New Jersey, have invented certain new and useful Improvements in Automobile and Vehicle Signaling Devices, of which the following is a specification.

This invention relates to signal devices intended to be used and displayed on the front part or side of automobiles or other vehicles, or to be attached to such portion of said automobile or vehicle as the peculiarities of construction of said vehicle may necessitate, and to the manner of operating and controlling the same.

The main objects of my invention are first, to provide a means for indicating, at the front or side of the automobile or vehicle, (or at such other place as the construction of such vehicle may require,) just what the driver's intentions are, whether he is going to turn to the right or left or continue on a straight course; second, to provide a means for the control of said signaling device; third, to provide a means for illuminating said device at night that the intentions of the driver may be made known at all times to pedestrians, the drivers of other vehicles and more especially to traffic policemen.

A further object of my invention is to provide a safety signaling device which will possess advantages in points of efficiency and durability, and is at the same time simple in construction and operation, and would manifestly prevent many accidents, especially at street intersections, by making known the driver's intentions.

With these and other objects in view, the invention consists in certain novel features of construction, combination and arrangement of parts as will be hereinafter described and claimed.

In the drawings: Figure 1 is a front elevation of my device, Fig. 2 is a perspective view of an automobile equipped with my device, the hand or semaphore indicating driver's intention of turning to the right at the next intersecting street.

Referring now in detail to the drawings in Fig. 1 A shows the hand shaped semaphore, weighted with lead, having both perpendicular and horizontal movements, to indicate the driver's intention of turning to the right or left, to stop or to reverse, or to pursue a straight ahead course.

B is a rod contained in the upright cylinder X X, connecting hand A with lever D at $D^2$ and used to move hand A at $C^1$ from horizontal to perpendicular position, as shown in $A^1$.

C is a hinge attached to handle A and upright cylinder X X and permits moving of hand from horizontal to vertical position or vice versa.

D is the lever controlling the raising and lowering of the hand A, being connected with rod B at $D^2$ by a bolt or pivot.

$D^1$ is the pivot securing lever D to the plate F. E, $E^1$ and $E^2$ are notches on the outer edge of the semi-circular plate F hereinafter described, these notches engaging the lever D in the various positions necessary to move the rod B controlling the hand A.

Z is a semi-circular strip of steel, with its surface pressing upon lever D causing same to remain engaged with notches E, $E^1$ and $E^2$ of the semi-circular plate F. It will be seen that Z acts as a spring to keep lever D in contact with notches E, $E^1$ and $E^2$.

F is a semi-circular plate attached to the upright cylinder X X containing the notches E, $E^1$ and $E^2$, also the pivot $D^1$, to which is fastened lever D, the latter operating about pivot $D^1$.

G is the lever which gives the rotary motion to the upright cylinder X X, having attached the hand A. $G^1$ is an annular metal band or collar that fastens the lever G to the upright cylinder X X. R is a pivot upon which moves the lever G. P is an upright cylinder or bearing made to contain the lower portion of upright cylinder X X. $X^1$ is the lower end of the upright cylinder X X and revolves in upright cylinder P.

Cylinder P is attached to the side of an automobile or vehicle by plates or flanges H, H, and has attached to its upper portion the circular plate M, horizontally placed, containing a rim with notches $F^1$, $F^2$, $F^3$, and $F^4$ which engage the lever G.

Y is a retarding spring attached at its lower end to lever G and in contact at its upper end with upright cylinder X X, having for its purpose the keeping of lever G in the notches F¹, F², F³, and F⁴. H H are the plates or flanges attached to upright cylinder P.

K, K, K, K, K, K are screw holes in plates or flanges H, H, allowing for the fastening of my device to an automobile or other vehicle.

L is lamp attached to upright cylinder X X revolving in connection therewith, its rays radiating upward, illuminating hand A.

In operation, my device, is attached by bolts in holes K in flanges H, H to the side or other part of automobile or other vehicle, convenient to driver's hand.

The driver, if intending to pursue a straight away course will operate the handle D and cause it to engage in notch E¹, this causing hand A, through action of rod B to assume a horizontal position.

Driver will then move lever G to notch F⁴ in rim M¹ of circular plate M. This moves upright cylinder X X in the base P, causing hand shaped semaphore to point to the front.

If it is the driver's intention to turn to the right at the next cross street, he gives notice of his intention to traffic policemen, pedestrians or drivers of other vehicles by moving lever G into notch F¹, causing hand shaped semaphore A to assume position shown in Fig. 2.

The driver gives notice of his intention to stop by engaging lever D with notch E in the rim of plate F, which causes through action of rod B, the hand shaped semaphore A to move by hinge C and assume a vertical position.

Lever D is held in contact with semi-circular plate F by the semi-circular strip of steel Z preferably presenting slightly convex surface to lever D and attached at either end of said semi-circular strip Z to plate F.

If the driver intends to reverse his car he will operate lever D and engage it with notch E¹ in rim of plate F causing hand shaped semaphore A to assume a horizontal position; he then will move lever G into notch F² of rim M¹ and this causing upright cylinder X X to rotate in the base P causing the hand shaped semaphore A to point to the rear.

If the driver intends to turn to the left he moves lever G into notch F³ in rim M¹ of circular horizontal plate M.

By moving the lever D into notch E² on plate F the hand shaped semaphore A, which is weighted with lead if so desired, will assume an angle of 45 degrees; this position is not indicated in drawing, but may be used in operation of my device.

Besides notifying traffic policemen, pedestrians and drivers of other vehicles of intention of driver of vehicle equipped with my device, it is obvious that it will also prevent accident or collision by reason of being visible to driver of automobile or other vehicle, in rear of vehicle equipped with my device, pursuing the same course.

The lamp L being attached by a clamp to revolving upright cylinder X X to a position below hand shaped semaphore A, keeps its rays at all times focused upon said hand shaped semaphore A, thus adapting my device for use by night as well as day.

Having thus fully described my invention, what I claim as new and desire to secure by Letters-Patent is:

The combination with a vehicle, of an indicator pointer swiveled to turn on a vertical axis to preindicate the course and to swing on a horizontal axis to indicate the stationary condition, and means for operating the pointer on either or both of its axes.

In testimony whereof I affix my signature in presence of two witnesses.

JOHN L. M. KELLY.

Witnesses:
 LEWIS C. CASE,
 ARTHUR J. KELLY.